(12) United States Patent
Crabtree et al.

(10) Patent No.: US 10,454,791 B2
(45) Date of Patent: Oct. 22, 2019

(54) HIGHLY SCALABLE DISTRIBUTED CONNECTION INTERFACE FOR DATA CAPTURE FROM MULTIPLE NETWORK SERVICE SOURCES

(71) Applicant: Fractal Industries, Inc., Reston, VA (US)

(72) Inventors: Jason Crabtree, Vienna, VA (US); Andrew Sellers, Monument, CO (US)

(73) Assignee: QOMPLX, INC., Reston, VA (US)

( * ) Notice: Subject to any disclaimer, the term of this patent is extended or adjusted under 35 U.S.C. 154(b) by 267 days.

(21) Appl. No.: 15/229,476

(22) Filed: Aug. 5, 2016

(65) Prior Publication Data
US 2017/0126517 A1  May 4, 2017

Related U.S. Application Data

(63) Continuation-in-part of application No. 15/206,195, filed on Jul. 8, 2016, which is a continuation-in-part of application No. 15/186,453, filed on Jun. 18, 2016, which is a continuation-in-part of application No. 15/166,158, filed on May 26, 2016, which is a continuation-in-part of application No. 15/141,752, filed on Apr. 28, 2016, which is a continuation-in-part of application No. 14/925,974, filed on Oct. 28, 2015, and a continuation-in-part of application No. 14/986,536, filed on Dec. 31, 2015, and a continuation-in-part of application No. 15/091,563, filed on Apr. 5, 2016.

(51) Int. Cl.
*H04L 12/26* (2006.01)
*H04L 12/24* (2006.01)
*G06Q 10/06* (2012.01)
*H04L 29/08* (2006.01)

(52) U.S. Cl.
CPC ............. *H04L 43/04* (2013.01); *G06Q 10/06* (2013.01); *H04L 41/145* (2013.01); *H04L 67/10* (2013.01)

(58) Field of Classification Search
CPC ......... H04L 43/04; H04L 43/12; H04L 67/10; G06F 9/54
See application file for complete search history.

(56) References Cited

U.S. PATENT DOCUMENTS

| 20,050,165 | | 7/2005 | Yeung et al. |
|---|---|---|---|
| 7,171,515 | B2 | 1/2007 | Ohta et al. |
| 2014/0215235 | A1* | 7/2014 | Lipasti ................. G06F 1/3206 713/320 |
| 2014/0359552 | A1 | 12/2014 | Misra et al. |
| 2016/0006629 | A1 | 1/2016 | Ianakiev et al. |
| 2017/0101278 | A1* | 4/2017 | Stone ..................... B65G 69/00 |
| 2018/0144610 | A1* | 5/2018 | Poder ................... G08B 25/003 |

\* cited by examiner

*Primary Examiner* — Kim T Nguyen
(74) *Attorney, Agent, or Firm* — Brian R. Galvin; Galvin Patent Law LLC

(57) ABSTRACT

A highly scalable distributed connection interface for data capture from multiple network service sources, comprising a connector module wherein, the connector module retrieves a plurality of business related data from a plurality of network data sources; employs a plurality of application programming interface routines to communicate with the plurality of business related data sources; accepts a plurality of analysis parameters and control commands directly from human interface devices or from one or more command and control storage devices; and specifies the action or actions to be taken on the retrieved business data.

15 Claims, 12 Drawing Sheets

HIGHLY SCALABLE DISTRIBUTED CONNECTION INTERFACE FOR DATA CAPTURE FROM MULTIPLE NETWORK SERVICE SOURCES

CROSS-REFERENCE TO RELATED APPLICATIONS

This application is a continuation-in-part of U.S. patent application Ser. No. 15/206,194, titled "ACCURATE AND DETAILED MODELING OF SYSTEMS WITH LARGE COMPLEX DATASETS USING A DISTRIBUTED SIMULATION ENGINE", and filed on Jul. 8, 2016, which is continuation-in-part of U.S. patent application Ser. No. 15/186,453, titled "SYSTEM FOR AUTOMATED CAPTURE AND ANALYSIS OF BUSINESS INFORMATION FOR RELIABLE BUSINESS VENTURE OUTCOME PREDICTION" and filed on Jun. 18, 2016, which is a continuation-in-part of U.S. patent application Ser. No. 15/166,158, titled "SYSTEM FOR AUTOMATED CAPTURE AND ANALYSIS OF BUSINESS INFORMATION FOR SECURITY AND CLIENT-FACING INFRASTRUCTURE RELIABILITY", and filed on May 26, 2016, which is a continuation-in-part of U.S. patent application Ser. No. 15/141,752, titled "SYSTEM FOR FULLY INTEGRATED CAPTURE, AND ANALYSIS OF BUSINESS INFORMATION RESULTING IN PREDICTIVE DECISION MAKING AND SIMULATION, and filed on Apr. 28, 2016, which is a continuation-in-part of U.S. patent application Ser. No. 14/925,974, titled "RAPID PREDICTIVE ANALYSIS OF VERY LARGE DATA SETS USING THE DISTRIBUTED COMPUTATIONAL GRAPH" and filed on Oct. 28, 2015, and is also a continuation-in-part of U.S. patent application Ser. No. 14/986,536, titled "DISTRIBUTED SYSTEM FOR LARGE VOLUME DEEP WEB DATA EXTRACTION", and filed on Dec. 31, 2015, and is also a continuation-in-part of U.S. patent application Ser. No. 15/091,563, titled "SYSTEM FOR CAPTURE, ANALYSIS AND STORAGE OF TIME SERIES DATA FROM SENSORS WITH HETEROGENEOUS REPORT INTERVAL PROFILES", and filed on Apr. 5, 2016, the entire specification of each of which is incorporated herein by reference in its entirety.

BACKGROUND OF THE INVENTION

Field of the Invention

The present invention is in the field of use of computer systems in business information management, operations and predictive planning. Specifically, the use of a highly scalable, distributed, and self-load balancing connection interface programmed to capture information from a wide range of network service sources and then format that information for tightly specified downstream business information system uses.

Discussion of the State of the Art

Over the past decade, the amount of financial, operational, infrastructure, risk management and philosophical information available to decision makers of a business from such sources as ubiquitous sensors found on a business's equipment or available from third party sources, detailed cause and effect data, and business process monitoring software has expanded to the point where the data has overwhelmed corporate executives' abilities to follow all of it and certainly to interpret and make meaningful use of that available data in a given business environment. In other words, the torrent of business related information now available to a corporate decision maker or group of decision makers has far outgrown the ability of those in most need of its use to either fully follow it or reliably use it. Failure to recognize important trends or become aware of information in a timely fashion has led to highly visible, customer facing, outages at NETFLIX™, FACEBOOK™, and UPS™ over the past few years, just to list a few.

There have been several developments in business software that have arisen with the purpose of streamlining or automating either business data analysis or business decision process. PLANATIR™ offers software to isolate patterns in large volumes of data, DATABRICKS™ offers custom analytics services, ANAPLAN™ offers financial impact calculation services and there are other software sources that mitigate some aspect of business data relevancy identification, analysis of that data and business decision automation, but none of these solutions handle more than a single aspect of the whole task. This insinuates the technology being used in the decision process as one of the variables as data from one software package often must be significantly and manually transformed to be introduced into the software for the next analysis, if appropriate software exists. This step is both inefficient use of human resources and has potential to introduce error at a critical process point.

There has also been a great proliferation in the use of network based service companies offering solutions for such business functions as customer relationship management, world event news sourcing, market news sourcing and analysis, infrastructure monitoring, human resource management, business real estate conditions, and government activity information sourcing from the world. This only serves to add to the overload of information described above, and, to be of use, must be carefully analyzed by any business information management system purporting to provide reliable predictions. A robust connection interface to all network service sources of business interest must be provided.

Currently, there are a small number of scriptable data capture and sort interfaces such as: Zapier and IFTTT, both able to connect to a number of network data sources. However, these offerings possess only very lightweight logic options for moving the captured data into specific categories or transformation pathways which greatly limit their usefulness in complex business situations often encountered. Another, Open Source, capture engine, Sparkta is focused on streaming aggregation and fails to provide flexibility for routinely supporting event-driven polling, in addition to, passive stream monitoring of third-party APIs and similar operations needed by a business operating system.

What is needed is a fully integrated system that retrieves business relevant information from many disparate and heterogeneous sources using a scalable, expressively scriptable, connection interface, identifies and analyzes that high volume data, transforming it to a business useful format and then uses that data to drive an integrated highly scalable simulation engine which may employ combinations of the system dynamics, discrete event and agent based paradigms within a simulation run such that the most useful and accurate data is obtained and stored for the needs of the analyst. This multimethod information capture, analysis, transformation and outcome prediction system forming a "business operating system."

SUMMARY OF THE INVENTION

Accordingly, the inventor has developed a highly scalable distributed connection interface for data capture from multiple network service sources. The connection interface is designed to enable simple to initiate, performant and highly available input/output from a large plurality of external networked service's and application's application programming interfaces (API) to the modules of an integrated predictive business operating system. To handle the high volume of information exchange, the connection interface is distributed and designed to be scalable and self-load-balancing. The connection interface possesses robust expressive scripting capabilities that allow highly specific handling rules to be generated for the routing, transformation, and output of data within the business operating system. Incoming data may be received by passive stream monitoring, or by programmed, event or time driven download of network service information to name just two possibilities. Output may be direct tabular display of raw or transformed data, graphical or derived graphical display, such as simulation presentation, either with or without persistence. Data may be persistently stored in any of several data stores for which the connection interface has internal API routines.

According to a preferred embodiment of the invention, a system for highly scalable distributed connection interface for data capture from multiple network service sources has been devised and reduced to practice. A connector module stored in a memory of and operating on a processor of a computing device wherein, the connector module: retrieves a plurality of business related data from a plurality of network data sources; employs a plurality of application programming interface routines to communicate with the plurality of business related data sources; accepts a plurality of analysis parameters and control commands directly from human interface devices or from one or more command and control storage devices; and specifies the action or actions to be taken on the retrieved business data;

According to another embodiment of the invention, a system for highly scalable distributed connection interface for data capture from multiple network service sources has been devised and reduced to practice. A connector module retrieves at least a portion of the business related data by continuous monitoring of information streams released by the network data sources. At least a portion of the streaming business related data may be isolated based upon use of filters. At least a portion of the business related data is retrieved from network data sources based upon an event trigger. At least a portion of the business related data is retrieved from network data sources based upon a time dependent trigger. At least a portion of the retrieved business related data is transformed by the connector module into a format useful for a pre-determined purpose. At least a portion of the retrieved business related data is routed to other modules in a business operation system for transformation into a format useful for a pre-determined purpose. At least a portion of the retrieved business related data is displayed and discarded. At least a portion of the retrieved business related data is persistently stored.

According to a preferred embodiment of the invention, a method for highly scalable distributed connection interface for data capture from multiple network service sources comprising the steps of: a) retrieving a plurality of business related data from a plurality of network data sources using a plurality of network data source specific application programming interface routines present in a connector module stored in a memory of and operating on a processor of a computing device; and b) routing the plurality of business related data to a plurality of modules comprising a business operating system based upon business related data specific parameters present in a connector module stored in a memory of and operating on a processor of a computing device.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
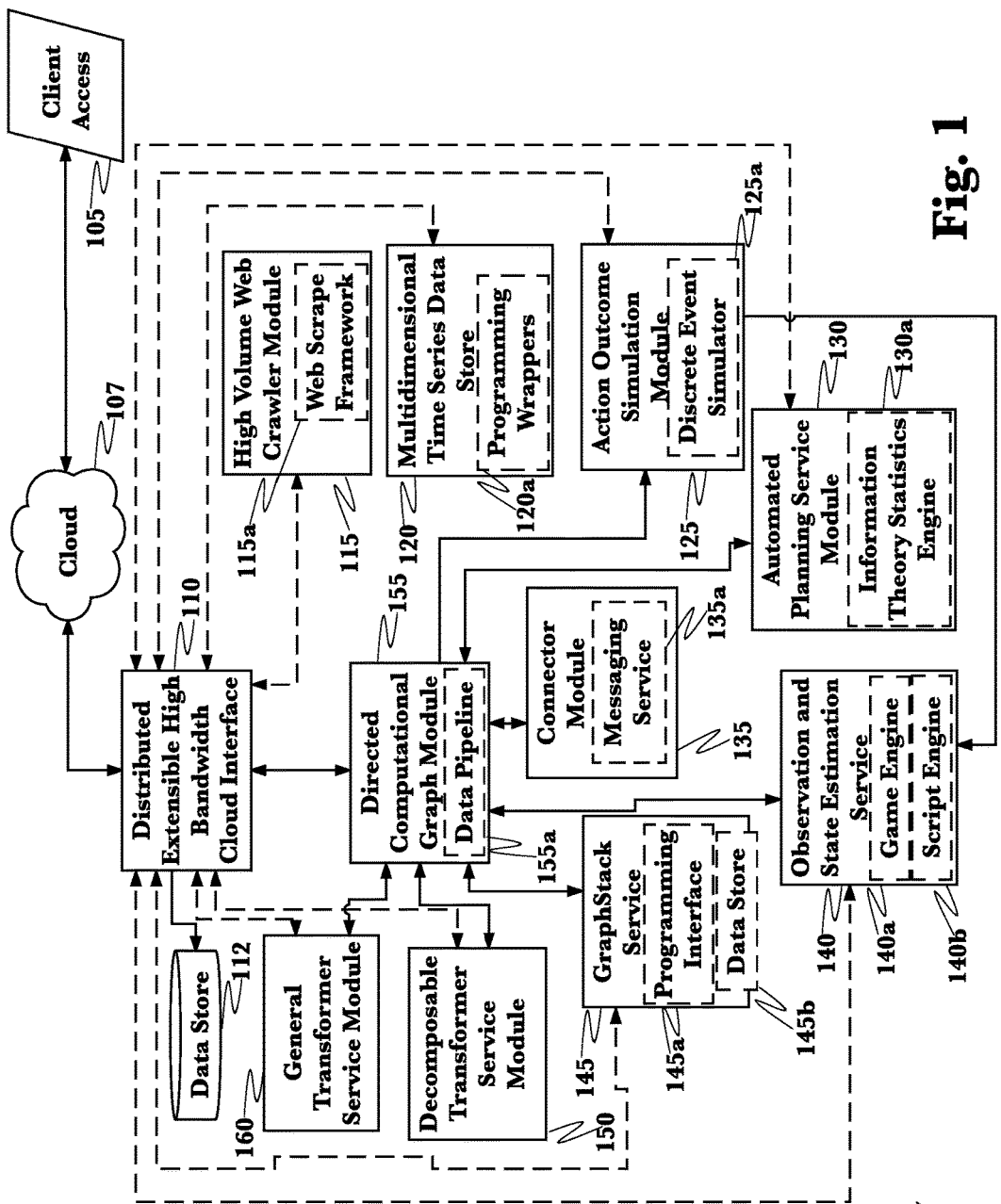
FIG. 1 is a diagram of an exemplary architecture of a business operating system according to an embodiment of the invention.

The inventor has conceived, and reduced to practice, a highly scalable distributed connection interface for data capture from multiple network service sources.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive data from a large plurality of sensors that may be of several different types. The multiple dimension time series data store module may also store any time series data encountered by the system such as but not limited to component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cueing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 100 has data from them, which no one really studied due to the great volume of columnar figures, so the alternative courses 125, 140 of action are run. The system, based on all available data, predicts that the fouled sensor or pump is unlikely to be the root cause this time due to other available data, and the contractor is dispatched. She finds a small breach in the pipeline. There will be a small cleanup and the pipeline needs to be shut down for repair but multiple tens of millions of dollars have been saved. This is just one example of a great many of the possible use of the business operating system, those knowledgeable in the art will easily formulate more.

Figure 2:
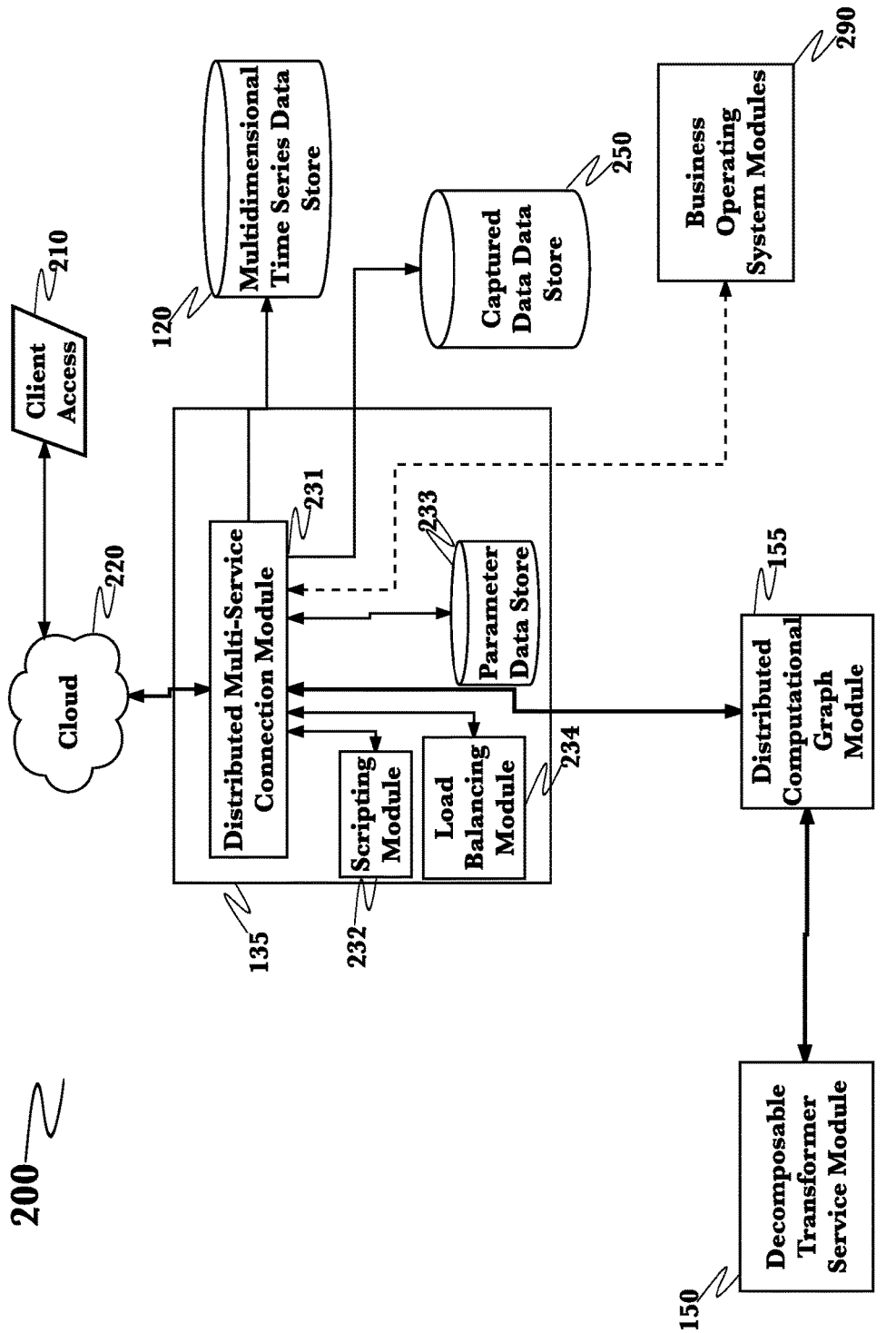
FIG. 2 is a diagram of an exemplary architecture of a connector module and related modules according to an embodiment of the invention.

FIG. 2 is a diagram of an exemplary architecture of a connector module and related modules according to an embodiment of the invention 200. The connector module 135 may be comprised of a distributed multiservice connection module 231 which coordinates connections between the business operating system 100 and external network service sources which may be, for example commercial, cloud based services such as but not limited to SALESFORCE™, BLOOMBERG™, THOMSON-REUTERS™, TWITTER™, FACEBOOK™, and GOOGLE™, while others may be internal network services such as a wireless network health monitor or applications both internal and external that provide output data required by business. The distributed multi-service connection module 231 comprises the API routines that allow it to retrieve either by passive stream monitoring or time or event driven active retrieval depending on the source and the pre-scripted instructions. API routines, analyst generated scripts governing connector module 135 operation, any needed parameters such as security and subscription credentials needed for one or more of the network service, command modifiers, trigger event descriptors, and time period descriptors to list just a few examples may be stored in a parameter data store 233. The inclusion of a robust, expressive scripting language with advanced logic constructs 232 which allows the routing and handling of data within and out of the distributed multi-service connection module sets this connection interface apart from those currently available such as ZAPIER™ and IFTTT™. The ability to retrieve data on event or time dependent bases raises the connector module's 135 abilities above those of SPARKTA™. Of great importance when using connection interface similar to that described here, is that even unexpectedly large influxes of data may be received without loss. To account for these possibilities, the connector module 100 is designed and implemented as a distributed cluster module that is highly and rapidly scalable and the module is self-load balancing capable 234. Information is captured, may have simple transformation done by the API routines but may also have more extensive transformation to convert into forms that are appropriate for the pre-intended use. Much of the data entering the business operating system 100 through the connector module 135 may thus be modified by decomposable transformer service module 150, which is accessed through distributed computational graph module 155. The decomposable transformer service module 150 may be employed in these instances because it is able to perform complex series transformation pathways which may be simple linear 500, branching 600, two sources into one output 700, and reiterative 800. The nature of transformations done are completely dependent on the intended downstream usage of that data with coding for each transformation pre-programmed and pre-selected for those purposes. Data, raw or transformed, may follow one of a plurality of output pathways as pre-programmed 232 for the data source and type. The data may be directly displayed at a client access terminal 210 which may be remote and network connected 220 or may be directly connected to the system (not shown for simplicity). Time series data, including system logs, performance data, and component logs, among others may be stored persistently in the multidimensional time series data store 120 which is specifically designed and therefore well suited for such data type. Data, raw or transformed may be stored in another data store 250 within the system as per author pre-determination or, the data may be sent to other components of the business system 290, 100, for example the automated planning service module 130 for predictive analytics, the action outcome simulation module 125 for simulation construction or the observation and state estimation service 140 for graphical representation.

Figure 3:
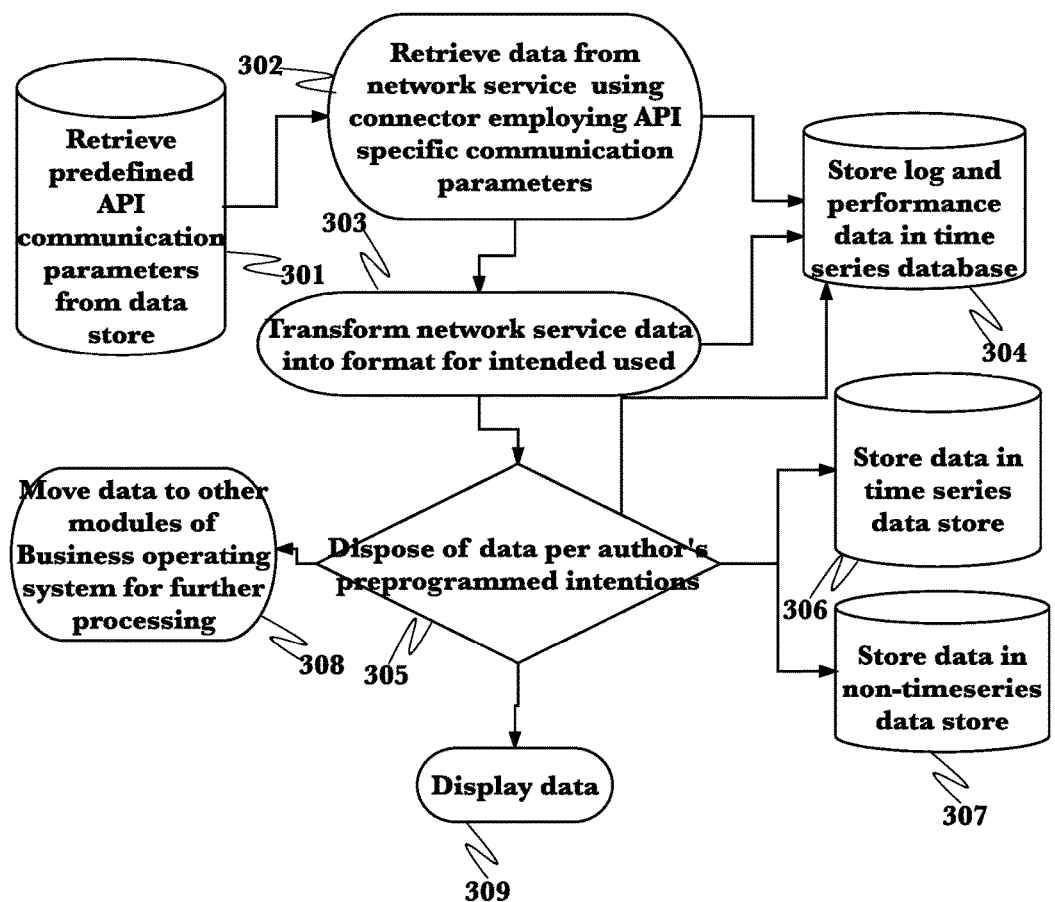
FIG. 3 is a flow diagram of the operation of an exemplary connector module according to an embodiment of the invention.

FIG. 3 is a flow diagram of the operation of an exemplary connector module according to an embodiment of the invention 300. Information from a plurality of network or cloud based service source which may include but are not limited to SALESFORCE™, BLOOMBERG™, THOMSON-REUTERS™, TWITTER™, FACEBOOK™, and GOOGLE™ using a connector module 135 specifically designed for the task 302. The connector module may store and retrieve API routines for the network services from which the desired information is retrieved as well as other parameters such as any security or subscription credentials, among other task related information from one or more databases in a data store 301. Retrieval may occur by passive monitoring of a network service's published data stream as may be the case for sources such as news providers or investment market tickers, to name a few such streaming sources known to those skilled in the art as important to business intelligence and operations through the use of predefined filters. Alternatively, retrieval may occur from a subset of network service sources on the basis of a pre-decided and pre-scripted triggering event of set of triggering events or on a timed interval trigger where the source may be polled for new information either at specific timed intervals or at specific times of the day. Other triggers for information retrieval may be known to those skilled in the art and do to robust, expressive python based scripting language designed into the connector module 135, the invention may be configured to employ any such strategy that can be programmed into a computing device.

Invoking scripts to be employed for specific triggers, time based or event based is simplified by the use of separate parameter files a sample template of which is shown:

```
01      "triggers": [
02          {
03              "uuid": "abscefg",
04          "name": "trigger-name",
05          "type": "time OR event",
06              "condition": [
07                  "name": "condition-name",
08                  "description": "condition-description",
09                  "pythonToEvaluate": "function which returns a boolean when specified input is provided"
10                  "pythonToFormatOutputForAction": "function to process available data/state information into action format"
11              ]
12              "action": "123456",
13          }
```

Of special note in the above listing are line 10 where, based upon the trigger, specific formatting may be performed on the incoming data prior to that data being routed to another module in the system 100 for possible further processing or display, and line 12 where the next action to be performed, most likely by another module of the business operating system such as, but not limited to the digital computational graph module 155 and decomposable transformer service module 150 303, the multidimensional time series data store 120, display at a client access terminal 105 or persistent storage in a data store (not shown). Actions brought about by combinations of these and other system modules as also possible. While other business system modules may participate in the processing of information retrieved by the connector module 200, 302, Much of the data modification done 303 may require the transformative capabilities of the decomposable transformer service module 150, which is accessed through distributed computational graph module 155, 400. The decomposable transformer service module 150 may be employed in these instances because it is able to perform complex series transformation pathways which may be simple linear 500, branching 600, two sources into one output 700, and reiterative 800. The nature of transformations done, for example, aggregation or audio to text translation are completely dependent on the intended downstream usage of that data with coding for each transformation pre-programmed and pre-selected for those purposes. Transformed data may then follow one of several paths to useful disposition which non-exhaustively includes passing the data to other modules of the business operating system 100, 308, displaying the data in tabular of graphical formats 309, or storing the data in a data store most suited to the type of data received 306, 307. Other activities performed by the connector module such as, but not limited to simple data aggregation and output formatting and routing are controlled by the same easily generated and maintained parameter lists and underlying PYTHON™ based scripts as listed above. It should be noted that, while PYTHON™ is currently used as the underlying scripting language, the invention is not reliant upon any specific language to fulfill this purpose and any similar scripting language known to those skilled in the art may be used in its place as utility warrants. Last, each retrieval and processing step, as well as supporting system activities as well as performance data, which may be involved in SLA standards compliance may be stored in the multidimensional time series data store 304, 120 either for metric or analytical monitoring transmission or later inspection during troubleshooting or metric review at a later time.

Figure 4:
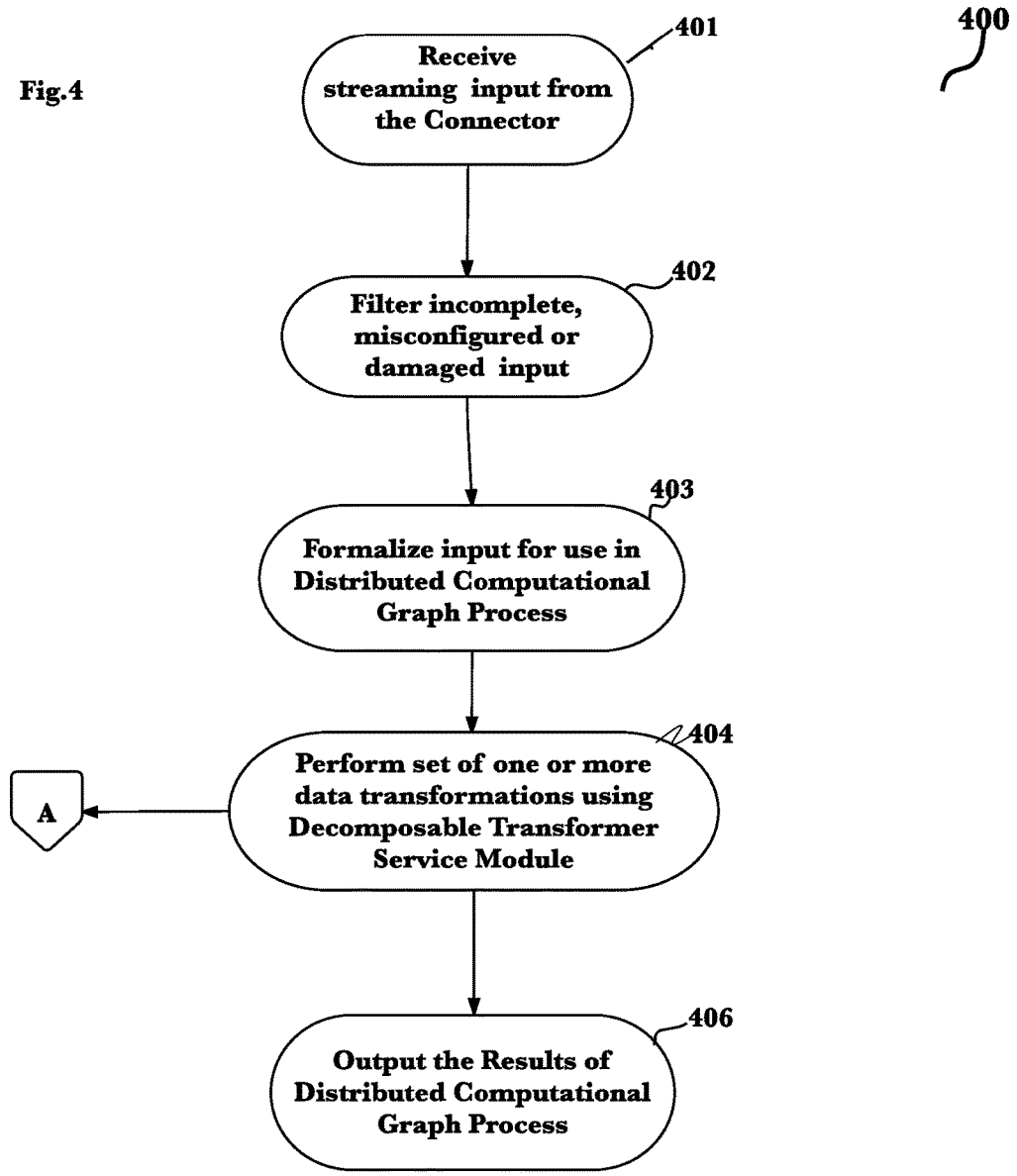
FIG. 4 is a process flow diagram of a method for the receipt, processing and predictive analysis of streaming data using a system of the invention.

FIG. 4 is a process flow diagram of a method 400 for predictive analysis of very large data sets using the decomposable transformation service module. One or more streams of data from a plurality of sources, which includes, but is in no way not limited to, the connector module 135, 200 of the business operating system 100, a number of physical sensors, web based questionnaires and surveys, monitoring of electronic infrastructure, crowd sourcing campaigns, and direct human interaction, may be received by system 401. The received stream is filtered 402 to exclude data that has been corrupted, data that is incomplete or misconfigured and therefore unusable, data that may be intact but nonsensical within the context of the analyses being run, as well as a plurality of predetermined analysis related and unrelated criteria set by the authors. Filtered data may be split into two identical streams at this point (second stream not depicted for simplicity), wherein one substream may be sent for batch processing while another substream may be formalized 403 for transformation pipeline analysis 404, 500, 600, 700, 800. Data formalization for transformation pipeline analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The formalized data stream may be subjected to one or more transformations. Each transformation acts as a function on the data and may or may not change the data. Within the invention, transformations working on the same data stream where the output of one transformation acts as the input to the next are represented as transformation pipelines. While the great majority of transformations in transformation pipelines receive a single stream of input, modify the data within the stream in some way and then pass the modified data as output to the next transformation in the pipeline, the invention does not require these characteristics. According to the embodiment, individual transformations may receive input of expected form from more than one source 700 or receive no input at all as would a transformation acting as a timestamp. According to the embodiment, individual transformations, may not modify the data as would be encountered with a data store acting as a queue for downstream transformations described in ¶064 of co-pending application Ser. No. 14/925,974. According to the embodiment, individual transformations may provide output to more than one downstream transformations 600. This ability lends itself to simulations where multiple possible choices might be made at a single step of a procedure all of which need to be analyzed. While only a single, simple use case has been offered for each example, in each case, that example was chosen for simplicity of description from a plurality of possibilities, the examples given should not be considered to limit the invention to only simplistic applications. Last, according to the invention, transformations in a transformation pipeline backbone may form a linear, a quasi-linear arrangement or may be cyclical 800, where the output of one of the internal transformations serves as the input of one of its antecedents allowing recursive analysis to be run. The result of transformation pipeline analysis may then be modified by results from batch analysis of the data stream and output in format predesigned by the authors of the analysis with could be human readable summary printout, human readable instruction printout, human-readable raw printout, data store, or machine encoded information of any format known to the art to be used in further automated analysis or action schema.

Figure 5:
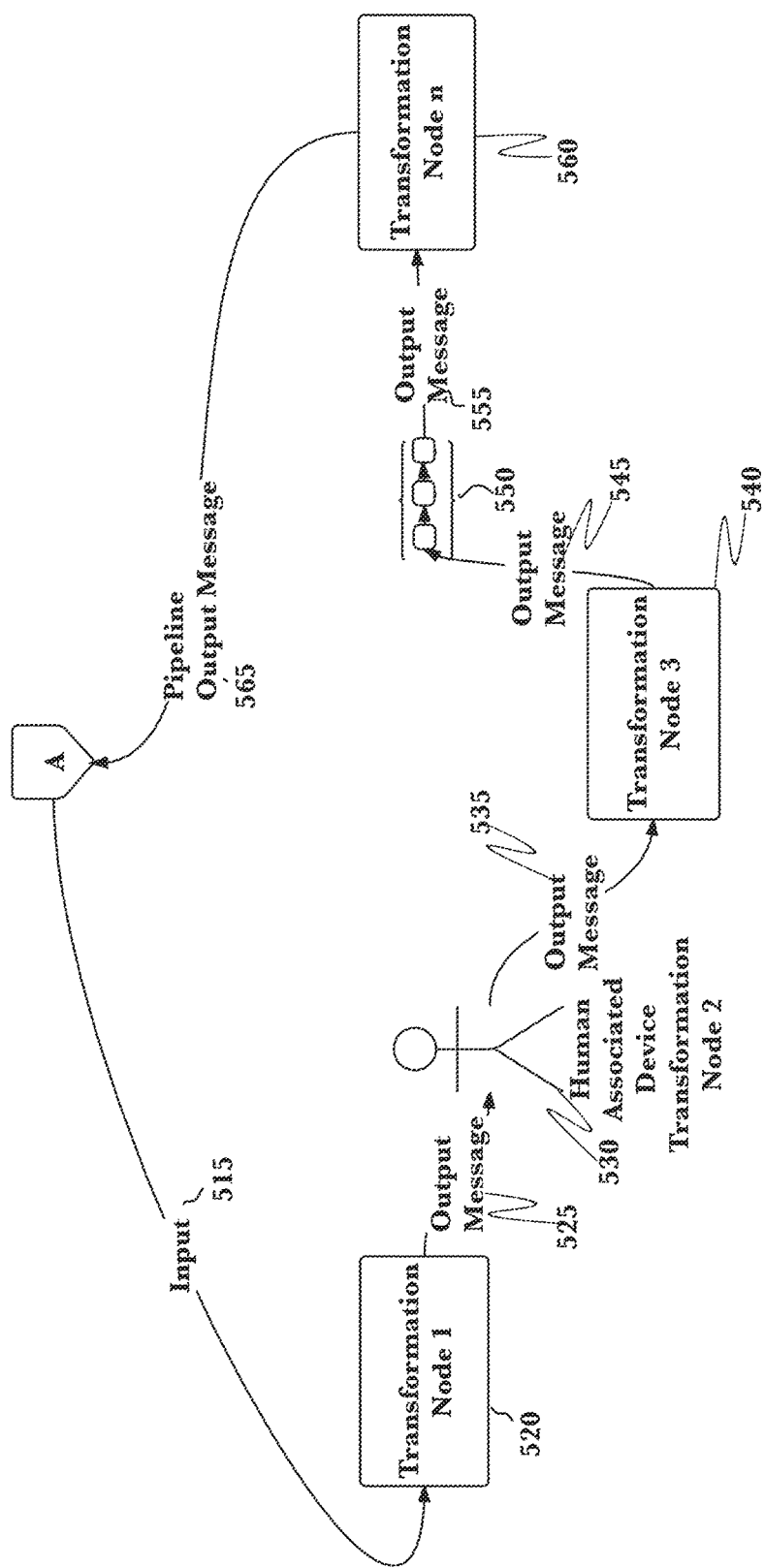
FIG. 5 is a flow diagram for a linear transformation pipeline system which introduces the concept of the transformation pipeline as a directed graph of transformation nodes and messages according to an embodiment of the invention.

FIG. 5 is a block diagram of a preferred architecture for a transformation pipeline within a system for predictive analysis of very large data sets using distributed computational graph 500. According to the embodiment, streaming input from the data filter software module 520, 515 serves as input to the first transformation node 520 of the transformation pipeline. Transformation node's function is performed on input data stream and transformed output message 525 is sent to transformation node 2 530. The progression of transformation nodes 520, 530, 540, 550, 560 and associated output messages from each node 525, 535, 545, 555 is linear in configuration this is the simplest arrangement and, as previously noted, represents the current state of the art. While transformation nodes are described according to various embodiments as uniform shape (referring to FIGS. 5-8), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 530, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further, according to the embodiment, individual transformation nodes in one pipeline may represent function of another transformation pipeline. It should be appreciated that the node length of transformation pipelines depicted in no way confines the transformation pipelines employed by the invention to an arbitrary maximum length 540, 550, 560 as, being distributed, the number of transformations would be limited by the resources made available to each implementation of the invention. It should be further appreciated that there need be no limits on transform pipeline length. Output of the last transformation node and by extension, the transform pipeline 560 may be sent back to connector module 200 for predetermined action.

Figure 6:
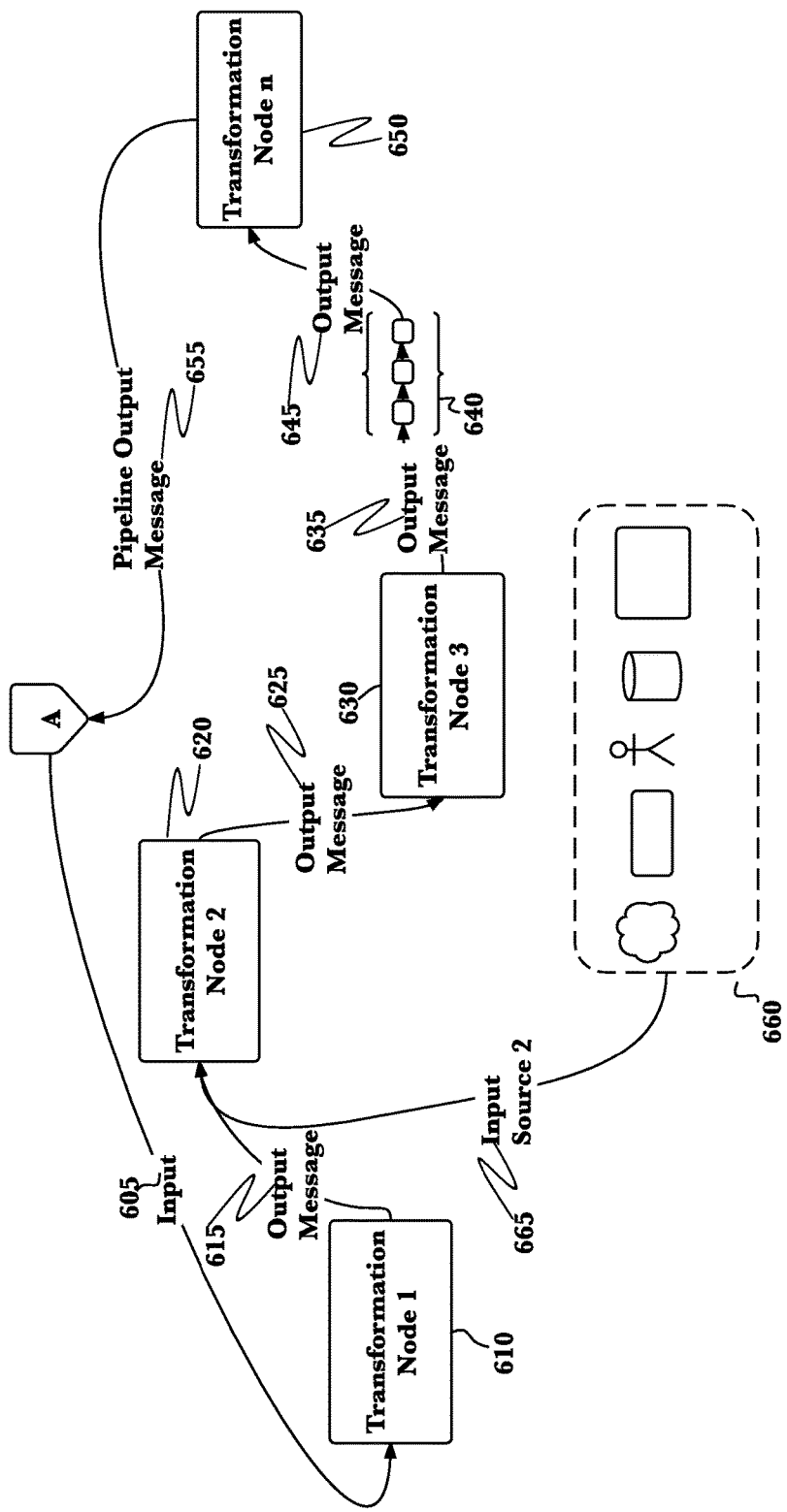
FIG. 6 is a flow diagram for a transformation pipeline system where one of the transformations receives input from more than one source which introduces the concept of the transformation pipeline as a directed graph of transformation nodes and messages according to an embodiment of the invention.

FIG. 6 is a block diagram of another preferred architecture for a transformation pipeline within a system for predictive analysis of very large data sets using distributed computational graph 600. According to the embodiment, streaming input from a data filter software module 200, 605 serves as input to the first transformation node 610 of the transformation pipeline. Transformation node's function is performed on input data stream and transformed output message 615 is sent to transformation node 620. In this embodiment, transformation node 620 has a second input stream 660. The specific source of this input is inconsequential to the operation of the invention and could be another transformation pipeline software module, a data store, human interaction, physical sensors, monitoring equipment for other electronic systems or a stream from the internet as from a crowdsourcing campaign, just to name a few possibilities 660. Functional integration of a second input stream into one transformation node requires the two input stream events be serialized. The invention performs this serialization using a decomposable transformation software module. While transformation nodes are described according to various embodiments as uniform shape (referring to FIGS. 5-8), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further according to the embodiment, individual transformation nodes in one pipeline may represent function of another transformation pipeline. It should be appreciated that the node length of transformation pipelines depicted in no way confines the transformation pipelines employed by the invention to an arbitrary maximum length 610, 620, 630, 640, 650, as, being distributed, the number of transformations would be limited by the resources made available to each implementation of the invention. It should be further appreciated that there need be no limits on transform pipeline length. Output of the last transformation node and by extension, the transform pipeline, 650 may be sent back to connector module 200 for pre-decided action.

Figure 7:
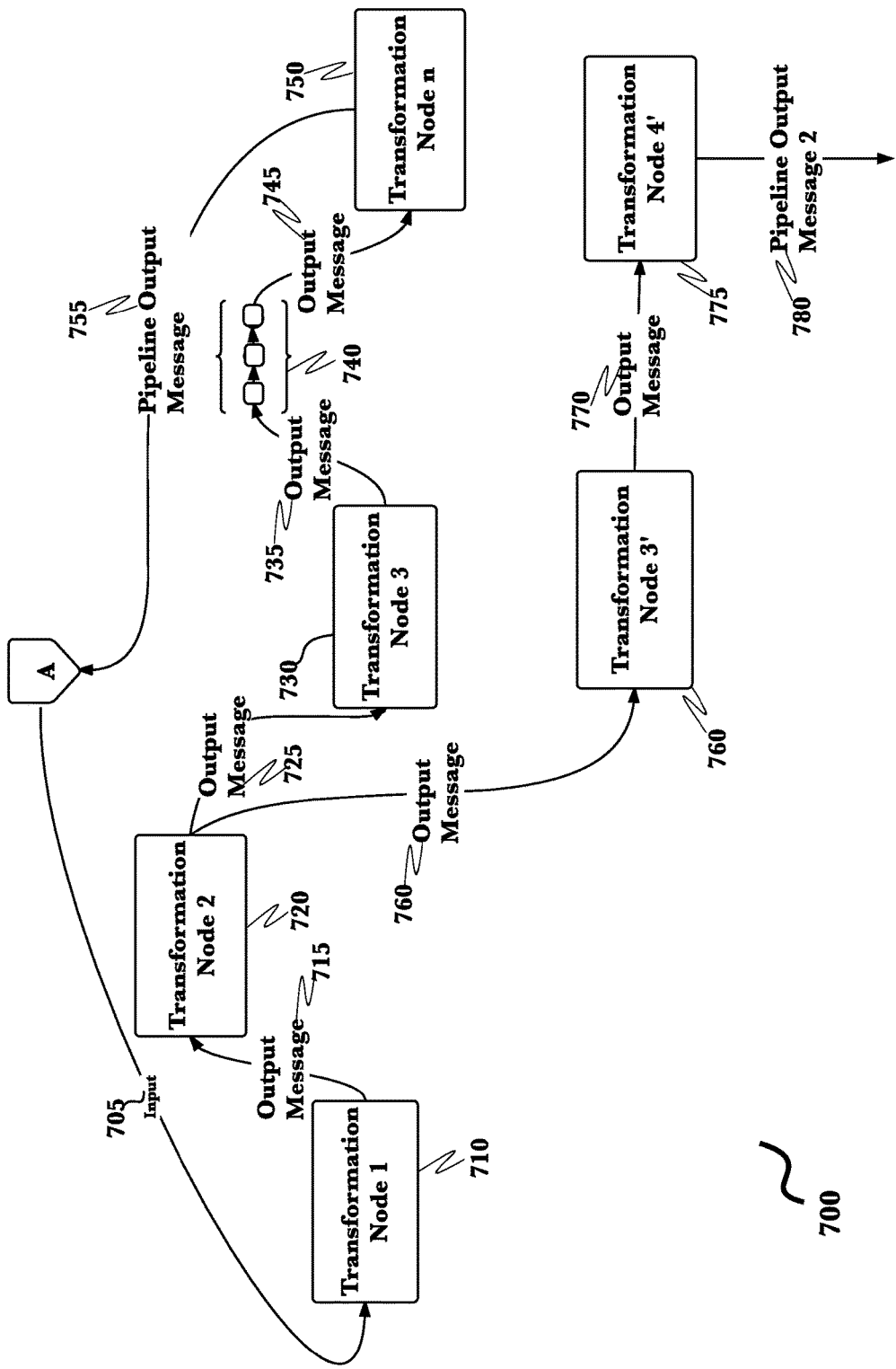
FIG. 7 is a flow diagram for a transformation pipeline system where the output of one data transformation servers as the input of more than one downstream transformations which introduces the concept of the transformation pipeline as a directed graph of transformation nodes and messages according to an embodiment of the invention.

FIG. 7 is a block diagram of another preferred architecture for a transformation pipeline within a system for predictive analysis of very large data sets using distributed computational graph 700. According to the embodiment, streaming input from a data filter software module 300, 705 serves as input to the first transformation node 710 of the transformation pipeline. Transformation node's function is performed on input data stream and transformed output message 715 is sent to transformation node 2 720. In this embodiment, transformation node 2 720 sends its output stream to two transformation pipelines 730, 740, 750, 765, 775. This allows the same data stream to undergo two disparate, possibly completely unrelated, analyses without having to duplicate the infrastructure of the initial transform manipulations, greatly increasing the expressivity of the invention over current transform pipelines. Functional integration of a second output stream from one transformation node 720 requires that the two output stream events be serialized. The invention performs this serialization using a decomposable transformation software module 150. While transformation nodes are described according to various embodiments as uniform shape (referring to FIGS. 5-8), such uniformity is used for presentation simplicity and clarity and does not reflect necessary operational similarity between transformations within the pipeline. It should be appreciated that one knowledgeable in the field will realize that certain transformations in pipelines, which may be entirely self-contained; certain transformations may involve direct human interaction, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations, among a plurality of other possibilities. Further according to the embodiment, individual transformation nodes in one pipeline may represent function of another transformation pipeline. It should be appreciated that the node number of transformation pipelines depicted in no way confines the transformation pipelines employed by the invention to an arbitrary maximum length 710, 720, 730, 740, 750; 765, 775 as, being distributed, the number of transformations would be limited by the resources made available to each implementation of the invention. Further according to the embodiment, there need be no limits on transform pipeline length. Output of the last transformation node and by extension, the transform pipeline 750 may be sent back to connector module 135 for programmatically enabled action.

Figure 8:
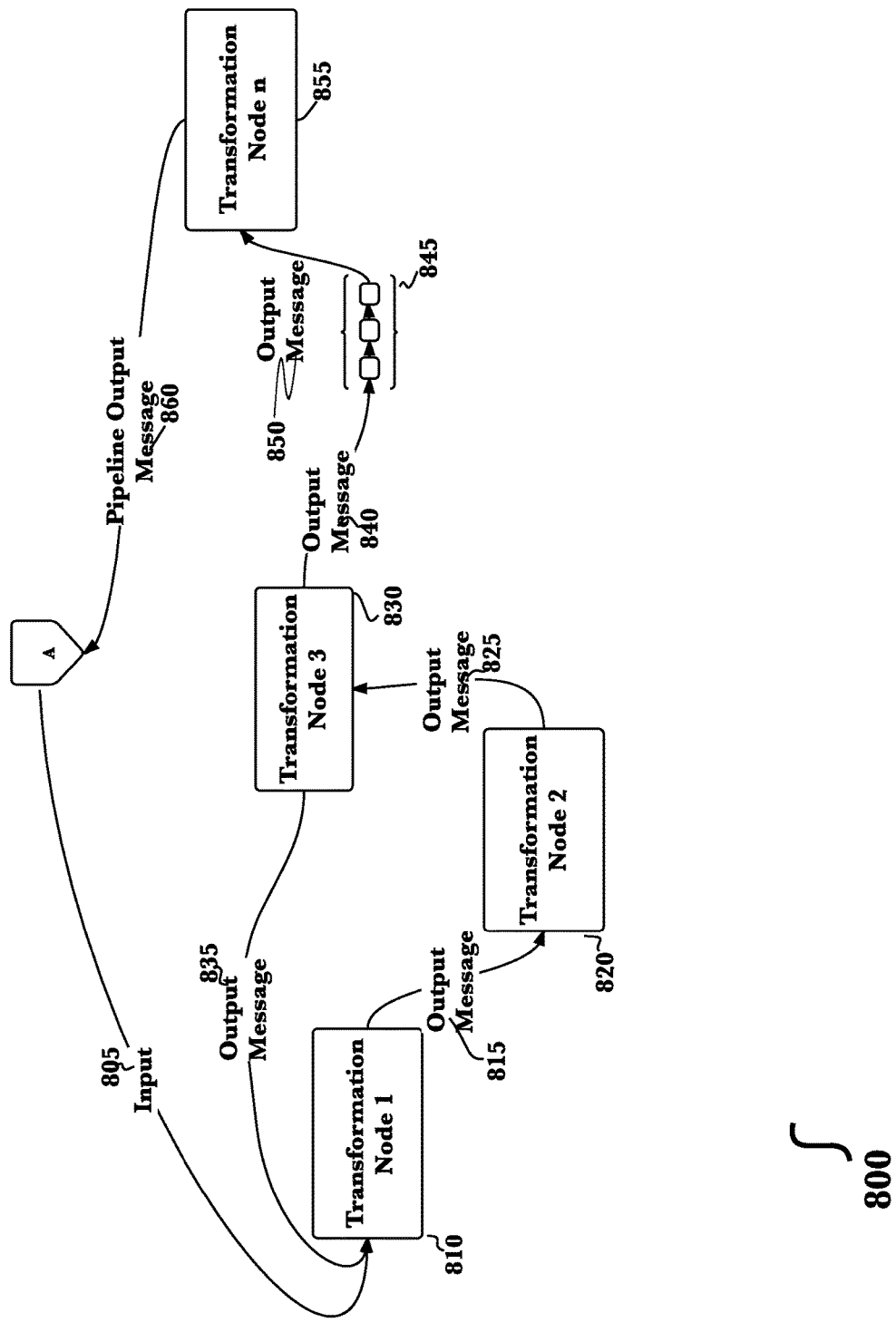
FIG. 8 is a flow diagram for a transformation pipeline system where a set of three data transformations act to form a cyclical pipeline which also introduces the concept of the transformation pipeline as a directed graph of transformation nodes and messages according to an embodiment of the invention.

FIG. 8 is a block diagram of another preferred architecture for a transformation pipeline within a system for predictive analysis of very large data sets using distributed computational graph 700. According to the embodiment, streaming input from a data filter software module 520, 805 serves as input to the first transformation node 810 of the transformation pipeline. Transformation node's function may be performed on an input data stream and transformed output message 815 may then be sent to transformation node 2 820. Likewise, once the data stream is acted upon by transformation node 2 820, its output is sent to transformation node 3 830 using its output message 825 In this embodiment, transformation node 3 830 sends its output stream back to transform node 1 810 forming a cyclical relationship between transformation nodes 1 810, transformation node 2 820 and transformation node 3 830. Upon the achievement of some gateway result, the output of cyclical pipeline activity may be sent to downstream transformation nodes within the pipeline 840, 845. The presence of a generalized cyclical pathway construct allows the invention to be used to solve complex iterative problems with large data sets involved, expanding ability to rapidly retrieve conclusions for complicated issues. Functional creation of a cyclical transformation pipeline requires that each cycle be serialized. The invention performs this serialization using a decomposable transformation software module, the function of which is fully described in ¶065 and ¶066 of co-pending application Ser. No. 14/925,974. While transformation nodes are described according to various embodiments as uniform shape (referring to FIGS. 5-8), such uniformity is used for presentation simplicity and clarity and does not reflect necessary operational similarity between transformations within the pipeline. It should be appreciated that one knowledgeable in the field will appreciate that certain transformations in pipelines, may be entirely self-contained; certain transformations may involve direct human interaction 530, such as selection via dial or dials, positioning of switch or switches, or parameters set on control display, all of which may change during analysis; still other transformations may require external aggregation or correlation services or may rely on remote procedure calls to synchronous or asynchronous analysis engines as might occur in simulations, among a plurality of other possibilities. Further according to the embodiment, individual transformation nodes in one pipeline may represent the cumulative function of another transformation pipeline. It should be appreciated that the node number of transformation pipelines depicted in no way confines the transformation pipelines employed by the invention to an arbitrary maximum length 810, 820, 830, 840, 850; 865, 875 as, being distributed, the number of transformations would be limited by the resources made available to each implementation of the invention. It should be further appreciated that there need be no limits on transform pipeline length. Output of the last transformation node and by extension, the transform pipeline 855 may be sent back to connector module 200 for programmatically enabled action.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 9:
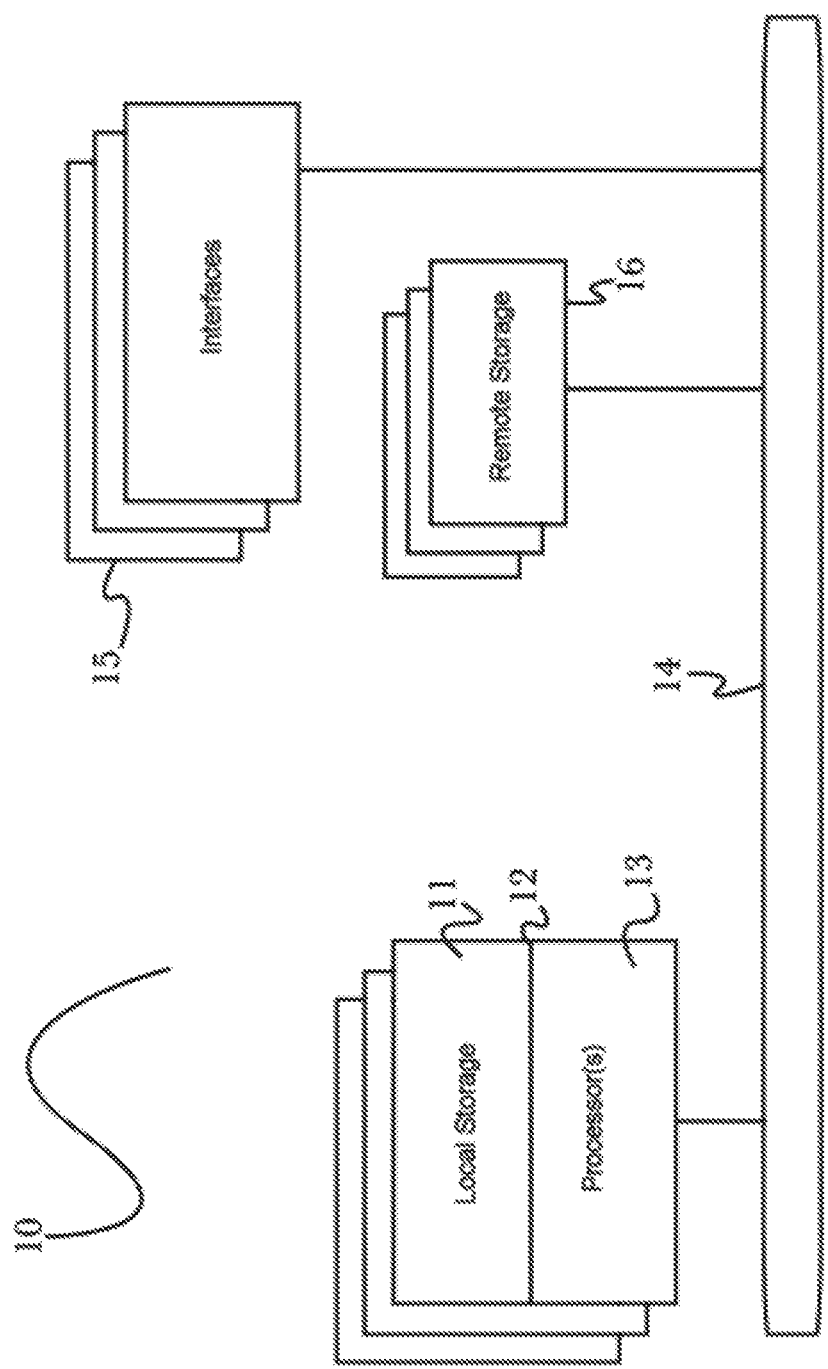
FIG. 9 is a block diagram illustrating an exemplary hardware architecture of a computing device used in various embodiments of the invention.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
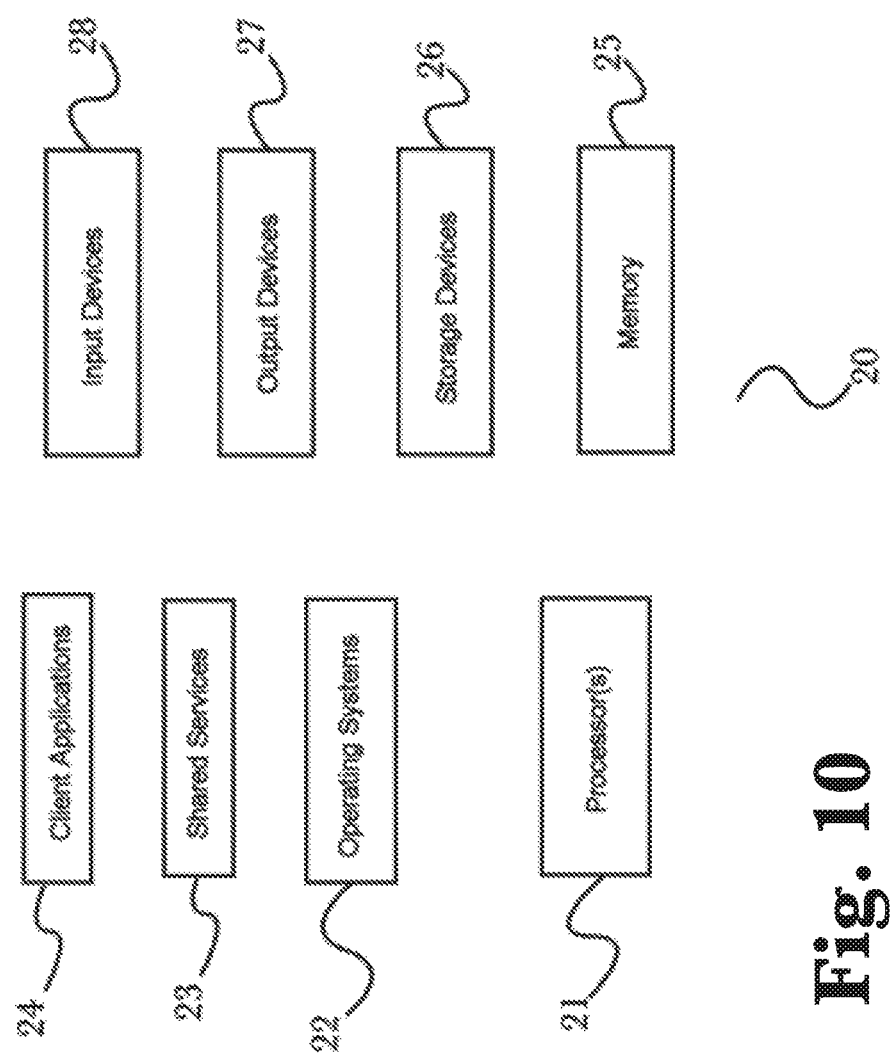
FIG. 10 is a block diagram illustrating an exemplary logical architecture for a client device, according to various embodiments of the invention.

In some embodiments, systems according to the present invention may be implemented on a standalone computing system. Referring now to FIG. 10, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 11:
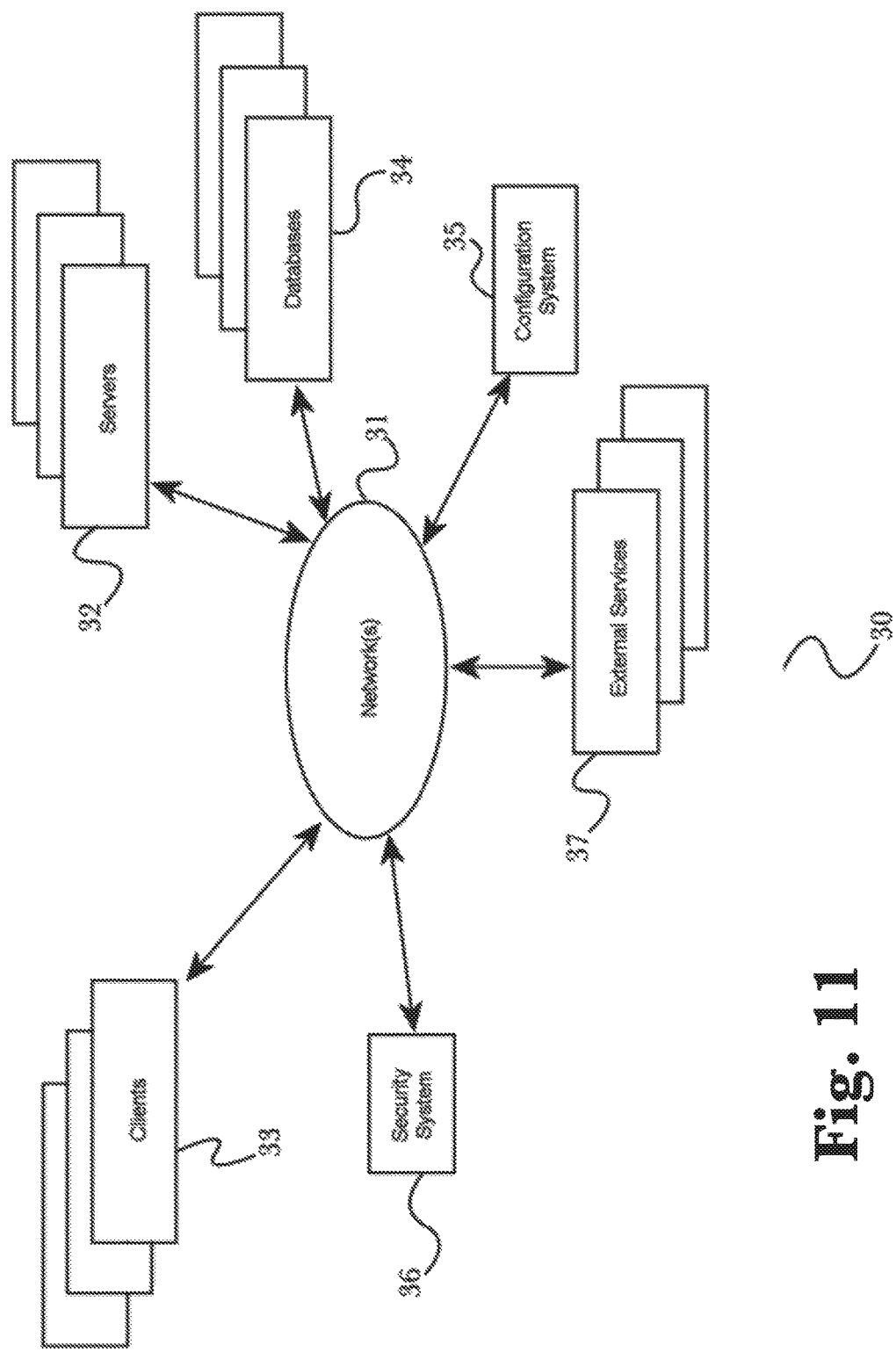
FIG. 11 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 11, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 12:
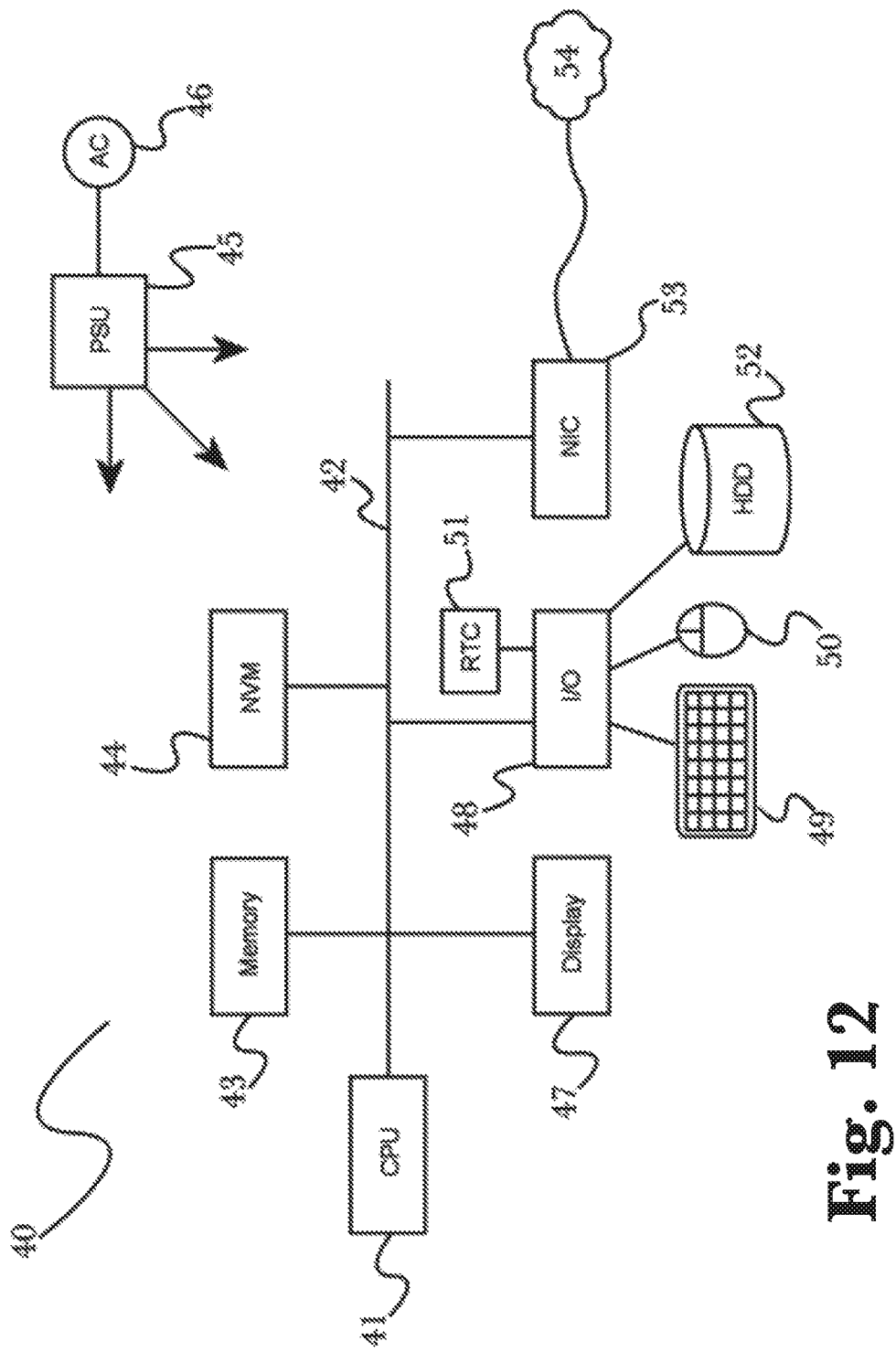
FIG. 12 is another block diagram illustrating an exemplary hardware architecture of a computing device used in various embodiments of the invention.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices or modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A system for highly scalable distributed connection interface for data capture from multiple network service sources comprising:
   a computing device comprising a memory, a processor, and a plurality of programming instructions:
   a connector module comprising connections to a plurality of network data sources and a portion of the plurality of programming instructions configured to cause the computing device to:
      employ a plurality of application programming interface routines to communicate with the plurality of network data sources;
      retrieve a plurality of business related data from the plurality of network data sources;
      accept a plurality of analysis parameters and control commands from a user of the system, the plurality of analysis parameters and control commands comprising:
         instructions to either passively monitor data or actively retrieve data from each network data source, depending on the network data source; and
         a pre-determined purpose for the data monitored or retrieved from each network data source, depending on the network data source; and
      send the data and the analysis parameters and control commands to a directed computational graph module; and
   a directed computational graph module comprising a directed computational graph comprising nodes representing data transformations and edges representing transformed message outputs, and a portion of the plurality of programming instructions configured to cause the computing device to:
      receive the data and the analysis parameters and control commands from the connector module; and
      direct a decomposable transformer service module to convert the data into a format based on the pre-determined purpose for the data; and
      send the data to the decomposable transformer service module;
      receive transformations and transformed message outputs from the decomposable transformer service; and
      update one or more nodes of the directed computational graph to represent the transformations, and update one or more edges of the directed computational graph to represent the transformation message outputs; and a decomposable transformer service module comprising a portion of the plurality of programming instructions configured to cause the computing device to:
receive the data and direction from the directed computational graph module;
convert the data into the format based on the pre-determined purpose for the data by performing a plurality of transformations on the data, wherein each transformation receives an input data stream and producing a transformed message output, and
send each transformation and transformed message output to the directed computational graph module.

2. The system of claim 1, wherein the the plurality of business related data is retrieved by continuous monitoring by the application programming interface routines of information streams released by the plurality of network data sources.

3. The system of claim 2, wherein at least a portion of the plurality of business related data may be isolated based upon use of filters.

4. The system of claim 1, wherein at least a portion of the plurality of business related data is retrieved from the plurality of network data sources based upon an event trigger.

5. The system of claim 1, wherein at least a portion of the plurality of business related data is retrieved from the plurality of network data sources based upon a time dependent trigger.

6. The system of claim 1, wherein at least a portion of the business related data is transformed by the connector module into a format useful for a pre-determined purpose.

7. The system of claim 1, wherein at least a portion of the plurality of business related data is displayed and discarded.

8. The system of claim 1, wherein at least a portion of the plurality of business related data is persistently stored.

9. A method for highly scalable distributed connection interface for data capture from multiple network service sources comprising the steps of:
employing, within a computing device, a plurality of application programming interface routines to communicate with a plurality of network data sources;
retrieving a plurality of business related data from the plurality of network data sources;
accepting a plurality of analysis parameters and control commands from a user, the plurality of analysis parameters and control commands comprising:
instructions to either passively monitor data or actively retrieve data from each network data source, depending on the network data source; and
a pre-determined purpose for the data monitored or retrieved from each network data source, depending on the network data source; and
directing a decomposable transformer service module of the computing device to convert the data into a format based on the pre-determined purpose for the data;
converting the data into the format based on the pre-determined purpose for the data by performing a plurality of transformations on the data, wherein each transformation receives an input data stream and produces a transformed message output; and
updating a directed computational graph with the converted data, where the directed computational graph comprises nodes which represent the transformations and edges which represent the transformed message outputs.

10. The method of claim 9, wherein the plurality of business related data is retrieved by continuous monitoring by the application programming interface routines of information streams released by the plurality of network data sources.

11. The method of claim 9, wherein at least a portion of the plurality of business related data may be isolated based upon use of filters.

12. The method of claim 9, wherein at least a portion of the plurality of business related data is retrieved from the plurality of network data sources based upon an event trigger.

13. The method of claim 9, wherein at least a portion of the plurality of business related data is retrieved from the plurality of network data sources based upon a time dependent trigger.

14. The method of claim 9, wherein at least a portion of the plurality of business related data is displayed and discarded.

15. The method of claim 9, wherein at least a portion of the plurality of business related data is persistently stored.

* * * * *